Figure 6:
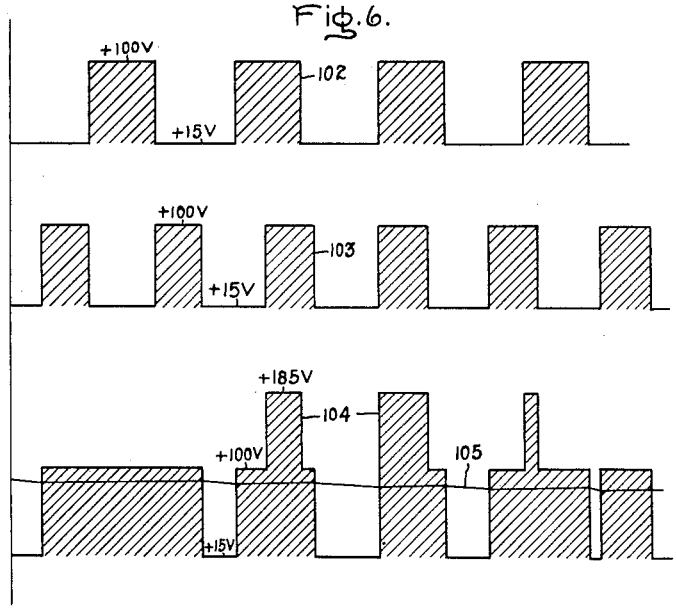

May 14, 1957     H. R. SUMMERHAYES, JR     2,791,931
NON-CONTACTING WIDTH GAGE
Filed Aug. 3, 1951     4 Sheets-Sheet 1
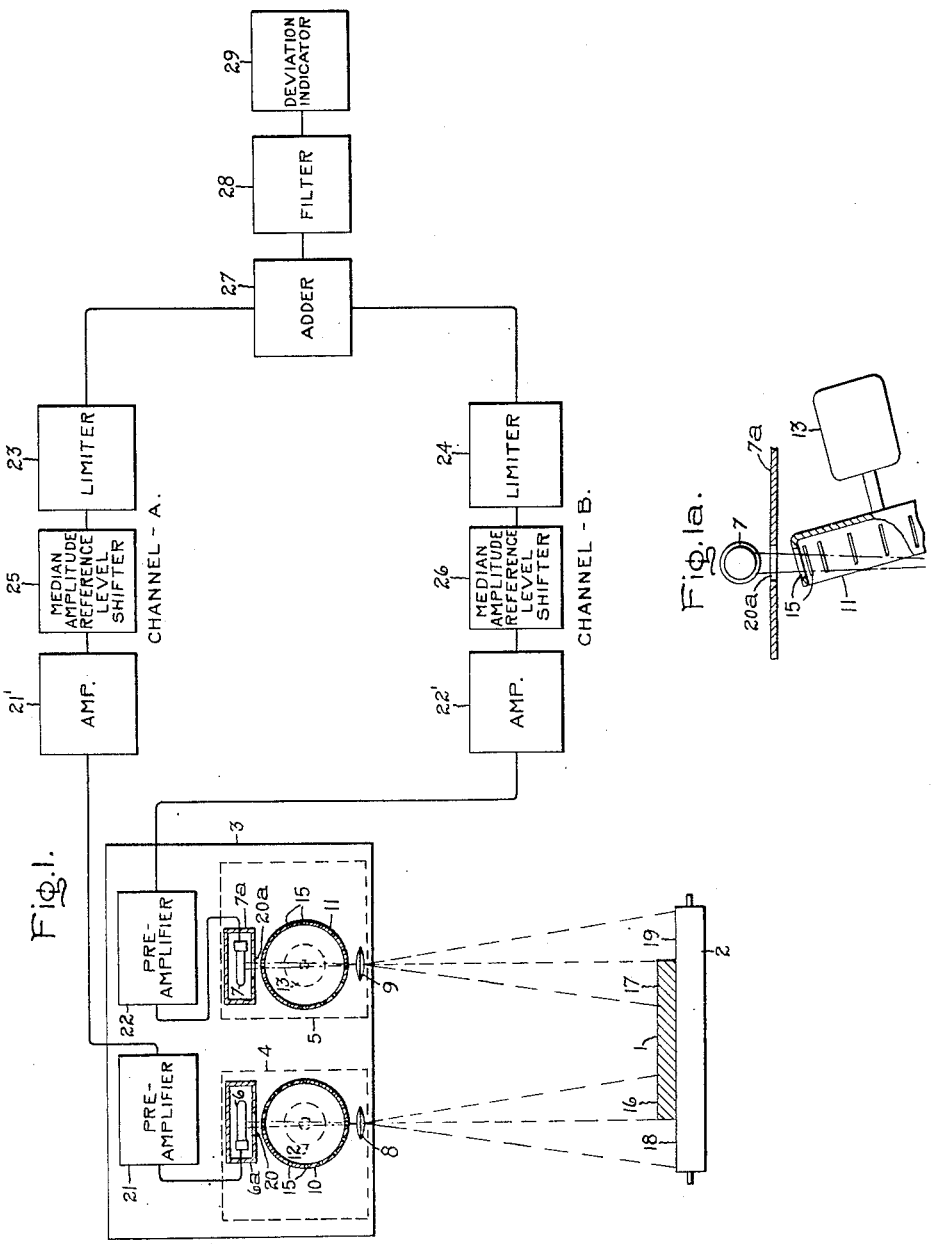
Inventor:
Harry R. Summerhayes, Jr.,
by Paul A. Frank
His Attorney.

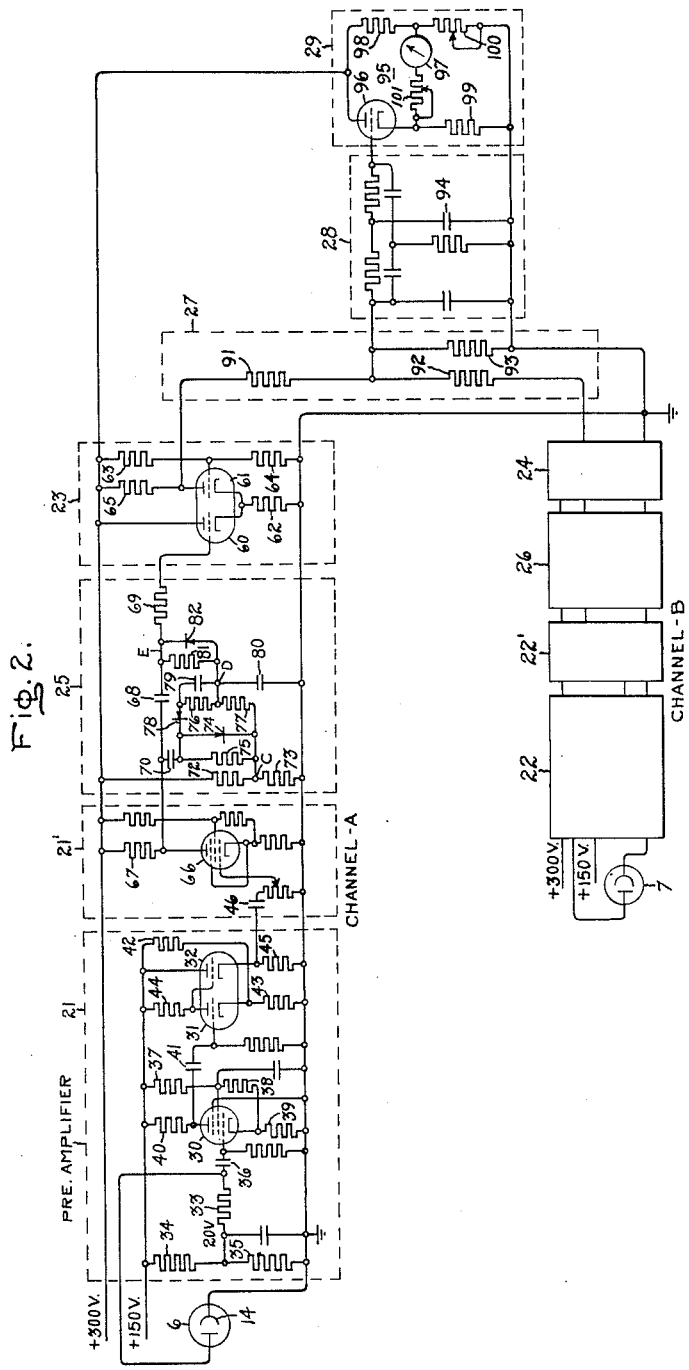

May 14, 1957     H. R. SUMMERHAYES, JR     2,791,931
NON-CONTACTING WIDTH GAGE
Filed Aug. 3, 1951     4 Sheets-Sheet 3
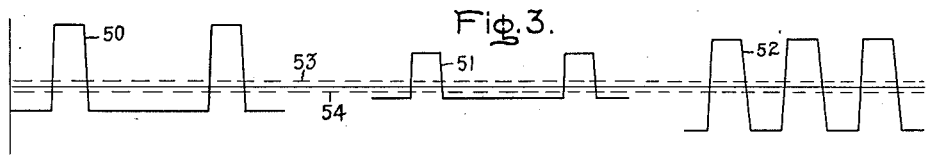
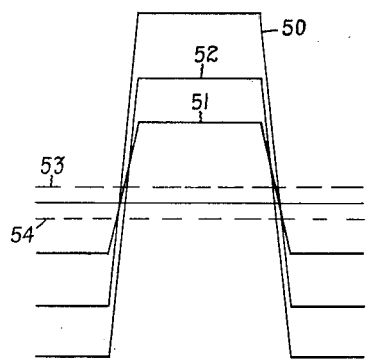
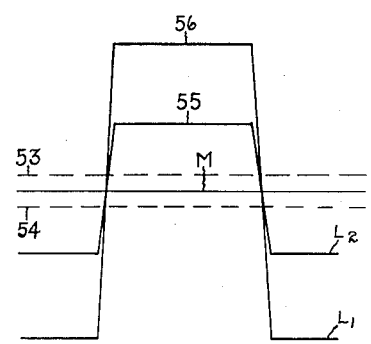
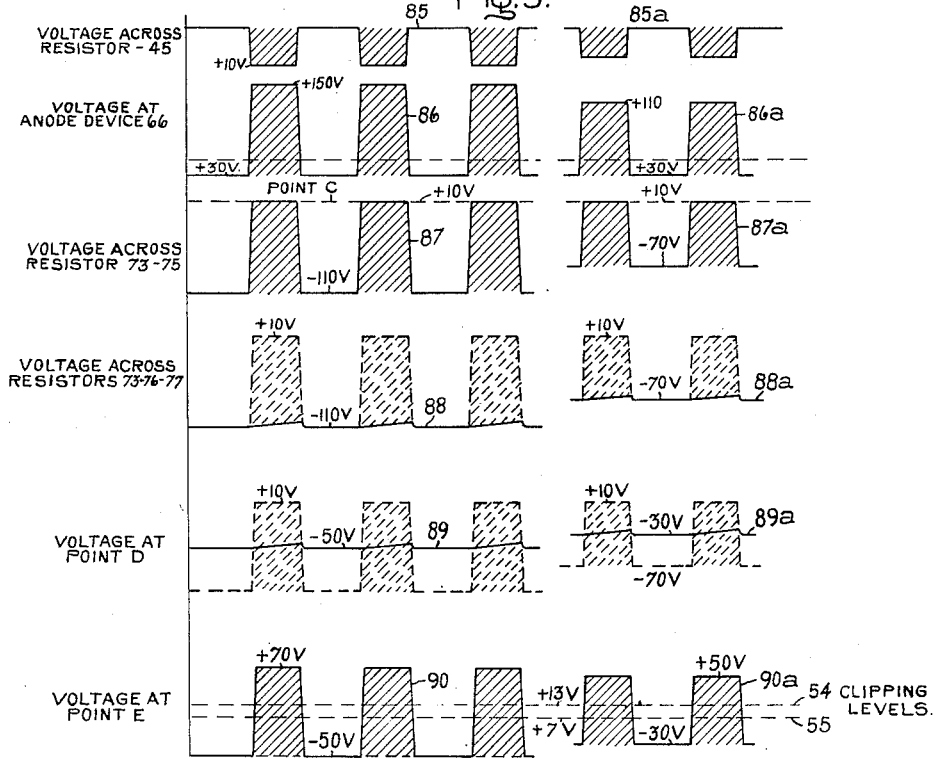
Inventor:
Harry R. Summerhayes, Jr.,
by Paul A. Frank
His Attorney.

United States Patent Office 2,791,931
Patented May 14, 1957

2,791,931
NON-CONTACTING WIDTH GAGE

Harry R. Summerhayes, Jr., Schenectady, N. Y., assignor to General Electric Company, a corporation of New York Application August 3, 1951, Serial No. 240,259

12 Claims. (Cl. 88—14)

My invention relates to non-contacting gages for measuring the width of luminous or illuminated objects, and more particularly to gages for continuously measuring the width of moving sheet material, such as hot steel strip in a rolling mill.

One type of non-contacting width gage particularly well suited for use in measuring the width of moving steel strip is described and claimed in U. S. Patent 2,548,590, granted to E. D. Cook on April 10, 1951. This patent discloses a dual edge-sighting gage in which a pair of electron cameras, separated by a distance equal to the normal value of the dimension to be measured, are positioned to view opposite edges of a luminous or illuminated object along parallel lines of sight. The cameras simultaneously scan their respective fields of view, and the time relation of the electric signals produced by the cameras as the respective edges of the object are scanned is used to indicate deviations from a normal value.

It will be appreciated that the use of electron cameras makes this gage quite expensive, and that the requisite electron scanning system and circuitry associated with each camera tube is quite complicated and critical of adjustment. Moreover, considerable care must be taken in circuit design to insure simultaneity and synchronization of scanning.

Accordingly, a principal object of my invention is to provide a non-contacting width gage of the dual edge-sighting type, which does not employ electron camera tubes or the complicated circuitry required for an electronic scanning system.

Another object of my invention is to provide a dual edge-sighting non-contacting width gage in which the scanning of the respective edges need not be completely simultaneous or synchronized.

In general, my invention comprises a pair of spaced optical systems for projecting images of opposite edge portions of a luminous or illuminated object to be measured upon a pair of photoelectric elements. Mechanical scanners scan the image periodically to produce two series of electric pulses from the two photoelectric elements, each series having pulse durations depending upon the width of one imaged edge portion. These pulses are then supplied to suitable amplifying and amplitude limiting circuits. The resulting constant amplitude pulses are all added electrically, and a unidirectional voltage representing the average component of the added pulses is obtained by suitable filtering means. This unidirectional voltage constitutes a measurement of the width of the object scanned and may be employed to energize a suitable deviation indicating means. Since the unidirectional voltage is the time integral of all the pulses produced by both scanning systems, there is no inherent necessity that the scanning be simultaneous or synchronized, although it is preferable that the scanning frequency of each system be of the same order of magnitude. In order that the system provide a considerable change in output voltage for a small change in width of the object measured, it is also preferable that the scanning repetition rate be so chosen that the duration of the pulse produced by the photoelectric element is a substantial portion of the scanning time.

One problem which arises in the use of a mechanical scanning system in the manner of my invention is that it requires a small but definitely discernible time for the scanning slit to sweep into and out of the imaged field of view effective upon the photoelectric element, with the result that it requires a corresponding small interval of time for conduction in the photoelectric element to rise and fall in response to the progressively increasing illumination as the slit enters the imaged field and the progressive darkening as the slit passes out of the imaged field. The width of the slit and the scanning rate determine the time of rise or decay of illumination to the steady-state conditions and this time of rise and decay is fairly constant. However, there is considerable variation in the rate of rise or decay of the resultant photoelectric element pulses with changes in the intensity of the illumination. Conventional pulse width measuring circuits are adversely affected by changes in the rate of pulse rise or decay so as to give a pulse width indication which is somewhat dependent upon the intensity of the illumination rather than dependent only upon the duration of the illumination, as is to be desired.

Accordingly, a further object of my invention is to provide a pulse width measuring or comparing circuit which is substantially independent of small changes in the rate of rise or decay of the input pulses, such as are often produced by changes in amplitude.

In fulfillment of this latter object, a specific object of my invention is to provide an amplitude limiter circuit for producing substantially square wave pulses of constant amplitude whose duration is equal to the median duration of input pulses of varying amplitude; the word "median" being employed in a sense to be more fully explained hereinafter.

Another problem encountered in gages of the above type which depend upon the duration of periodically received pulses is that changes in pulse duration also produce corresponding changes in the ratio of the effective or "on" pulse period to the noneffective or "off" period. This ratio of "on" to "off" periods for each pulse cycle is commonly called the "percentage pulse width," and a large variation in the percentage pulse width is usually desired in order to increase the sensitivity of the gage.

Most pulse width responsive circuits, however, commonly employ capacitively coupled amplitude limiters, and any variation in the percentage pulse width affects the level of instantaneous peak-to-peak voltage at which the pulses are capacitively coupled to the limiter. Due to the finite time of rise and decay of the pulses, this variation in input peak-to-peak voltage levels, in turn, affects the width of the output pulses of the limiter and thus introduces slight errors in measurement.

Accordingly, a still further object of my invention is to provide a pulse width responsive circuit of the type employing capacitively coupled amplitude limiters in which the duration of output pulses is independent of variations in the percentage pulse width.

The novel features which I believe characteristic of my invention are set forth in the appended claims. My invention itself, however, together with further objects and advantages thereof, may be better understood by reference to the following description taken in connection with the accompanying drawings, in which Fig. 1 diagrammatically illustrates, partially in block diagram form, the overall system of my invention; Fig. 1a is a side view of the mechanical scanning means shown in Fig. 1; Fig. 2 is a schematic circuit diagram showing the electrical components and circuits preferably employed in my invention; Figs. 3 and 3a illustrate a number of voltage wave shapes explanatory of the dependence of pulse width upon pulse amplitude and percentage pulse width in conventional amplitude limiting circuits; Fig. 4 is a number of voltage waves corresponding to those of Fig. 3, illustrating the principle of operation of the pulse width measuring circuit of my invention whereby the duration of the resulting amplitude limited pulses is made substantially independent of variations in amplitude or percentage pulse width of the input signal; Fig. 5 is a group of voltage waves such as are produced at various points in the median amplitude reference level shifter employed in my invention; and Fig. 6 is a group of typical voltage waves such as are produced in the adder and filter of my invention.

Referring to Fig. 1, the object to be measured is illustrated as a steel strip 1 supported and moved in a direction perpendicular to the page by rolls 2 of a run-out table for the steel strip. The dual edge-sighting and pulse producing components of the gage are preferably supported together to form a scanning head 3 located above the object to be gaged. Scanning head 3 includes a pair of laterally spaced sighting systems 4 and 5 and a pair of pulse pre-amplifiers 21 and 22. Sighting systems 4 and 5 include photoelectric elements shown as phototubes 6 and 7 within light impervious compartments 6a and 7a; optical systems such as provided by lenses 8 and 9 for imaging opposite edge portions 16 and 17 of the sighted object 1 through light compartment apertures 20 and 20a upon the photocells 6 and 7 respectively; and mechanical scanning means for scanning the imaged edge portions along a dimension in the same direction as the lateral spacing, such as may be provided by scanning cylinders 10 and 11 rotated at a constant speed by motors 12 and 13 respectively.

Details of the scanning components included in sighting systems 4 and 5 are shown in Figures 1 and 1a. Since the two scanning systems are identical, only scanning system 4 is now described. Phototube 6 is located within compartment 6a above and near the periphery of cylinder 10 with the longitudial dimension of its photosensitive cathode 14 tangentially disposed relative to the cylinder surface. Cylinder 10 is longitudinally slotted at equally spaced circumferential points to provide equally spaced light admitting scanning apertures 15, and these slots or apertures 15 are preferably spaced by an amount slightly greater than the longitudinal dimension of photosensitive cathode 14. Lens 8 is positioned to project, in the absence of cylinder 10, an image of its viewed object edge portion 16 through a light admitting aperture 20 in compartment 6a upon photosensitive cathode 14. Thus, the aperture 20 provides a fixed image reference. That is, it provides a fixed field of view or image area which is projected on the photosensitive device 6. Therefore, if the edge of the luminous strip shifts, the field viewed remains constant but the portion of the strip (transverse to its longitudinal axis) viewed varies in accordance with the shift. The practical significance of this is that the light emitting portion of the viewed area and, consequently, the signal generating portion thereof, varies with the position of the edge of the steel strip 1. When the rotating scanning cylinder 10 is interposed in the inclined position illustrated in Fig. 1a, the sweeping movement of equally spaced apertures 15 across cathode 14 provides an elemental scanning of this projected image. Cylinder 10 is preferably rotated at relatively low speed to provide a low pulse repetition scanning frequency such as 30 cycles per second. Other mechanical scanning means such as spiral shaped scanning disks, or radially or spirally slotted disks may alternatively be employed. In order to establish definite boundary conditions of illumination to which the phototube is responsive aperture 20 is made to have a smaller width than the longitudinal dimension of cathode 14, as shown, or suitable masks (not shown) may alternatively be placed around opposite end portions of photocell 6 leaving only a predetermined central portion of the photosensitive cathode 14 exposed to illumination by light transmitted through lens 8 and aperture 20.

The distance between the sighting systems 4 and 5 is adjusted so that lenses 8 and 9 are directly above opposite edges of steel strip 1 and separated by an amount equal to the normal value of the dimension (width) of the steel strip 1 to be measured. The various components of sighting system 4 are supported together, and the components of sighting system 5 are supported together, as indicated in Fig. 1 by their enclosure within separate dashed lines. The relative lateral position of the sighting systems 4 and 5 is preferably made adjustable by having the common supporting structure of each system carried upon any suitable adjustable carriage means (not shown) such as illustrated in the Cook Patent 2,548,590 for the adjustment of the camera tubes shown in that patent. Since the steel strip is either red hot or white hot when being gaged, the intensity of the illumination upon the phototubes 6 and 7 produced by the imaged edge portions 16 and 17 of strip 1 is much greater than the images of the portions 18 and 19 of the respective fields of view which lie beyond the edges of strip 1. Due to the scanning action of cylinders 10 and 11 in the same direction as the lateral spacing of the fields of view, conduction in phototubes 6 and 7 is greatly increased as apertures 15 pass over the width of the images of the respective opposite luminous edge portions 16 and 17 of strip 1, and electric pulses whose duration is related to the width of these luminous strip edge portions are produced from photoelectric elements 6 and 7 when they are connected in suitable electric circuits.

These phototube output pulses are amplified by pre-amplifiers 21 and 22 which are preferably located within scanning head 3 in order to minimize the length of the connections between the phototubes 6 and 7 and the pre-amplifiers 21 and 22, and thus minimize attenuation of the photoelectric element output signals. The amplified pulses provided by pre-amplifiers 21 and 22 are then supplied to two separate channels A and B, comprising additional amplifiers 21′ and 22′, median amplitude reference level shifters 25 and 26, and pulse squaring and amplitude limiting circuits designated as limiters 23 and 24 respectively. As will be explained more fully hereinafter, median amplitude reference level shifters 25 and 26 supply the amplified photoelectric element output pulses to limiters 23 and 24 in a manner such that the resulting amplitude limited square wave pulses produced by the limiters vary only in accord with changes in duration of the individual pulses and are substantially independent of changes in percentage pulse width or in the rate of pulse rise or decay.

The constant amplitude pulses produced by both channels A and B are then algebraically combined electrically in an adder 27 and a uni-directional voltage representing the average voltage component of all the added pulses is obtained by passing them through a filter 28 such as a scanning frequency rejection filter. This average uni-directional voltage is employed to energize a deviation indicator 29.

Referring now to Fig. 2, I have shown in schematic circuit diagram the components of my improved gage that are shown in block diagram in Fig. 1. Since the amplifiers, reference level shifting circuits, and limiters associated with respective photoelectric elements 6 and 7 are substantially identical, the circuit diagram of only one such channel A is shown in full, the other channel B being shown in block diagram. Pre-amplifier 21 may be any conventional type and is shown as comprising two stages of voltage amplification associated with electron discharge devices 30 and 31, and an output cathode follower stage associated with electron discharge device 32. Voltage for the anode of the photoelectric element 6 is obtained by connection through a load resistor 33 to a voltage dividing network comprising resistors 34 and 35 connected between a source of positive potential such as 150 volts and ground.

The negative-going pulse of voltage produced across resistor 33 upon conduction of photoelectric element 6 is supplied through a coupling capacitor 36 to a control electrode of pentode discharge device 30. Proper screen electrode voltage and biasing voltage for discharge device 30 is provided by a voltage dividing network comprising resistors 37, 38 and cathode resistor 39 connected between the 150-volt source and ground. An amplified positive-going voltage pulse is developed across a load resistor 40 connected between the anode of discharge device 30 and the positive voltage source, and this amplified positive going pulse is coupled through capacitor 41 to a control electrode of triode electron discharge device 31. Proper biasing voltage for discharge device 31 is provided by connection from the cathode thereof to a voltage dividing network comprising resistor 42 and cathode resistor 43 connected between the positive voltage source and ground. The resulting amplified negative-going voltage pulse, developed across an anode load resistor 44 for device 31, is directly coupled to a control electrode of the cathode follower discharge device 32. The output amplified voltage pulse of amplifier 21 is taken across a cathode resistor 45 associated with device 32 and supplied to the median amplitude reference level shifter 25 through amplifier 21'.

Amplifier 21' is shown as a voltage amplification stage associated with a pentode discharge device 66, similar to that associated with pentode discharge device 30. This additional amplification may not be necessary, and the amplified output pulses of the amplifier 21' may be directly connected to the reference level shifter 25 without this additional amplification. In amplifier 21', as shown, the additionally amplified output voltage pulse is developed across a load resistor 67, connected between the high voltage source and the anode of electron discharge device 66. This amplified pulse is coupled to the control electrode of discharge device 60 of limiter 23 through capacitor 68 and current limiting resistor 69, and also coupled through capacitor 70 to the median amplitude reference level shifting network 25.

Amplitude limiter 23 is shown as comprising a pair of cathode-coupled triode electron discharge devices 60 and 61, having their respective cathodes connected to ground through a common cathode resistor 62. Discharge device 61 is biased within its conduction characteristic by connection from its control electrode to a voltage dividing network comprising resistors 63 and 64 connected between a second higher source of positive potential, such as 300 volts, and ground.

Discharge device 60 and resistor 62 constitute a cathode follower with the value of resistor 62 sufficiently high that large positive excursions of voltage on the control electrode of device 60 can be made without causing appreciable current flow to the control electrode, thus protecting the median amplitude reference level shifter 25 from the effects of such current. Further protection from the effects of exceptionally large swings is afforded by current limiting resistor 69.

In the operation of limiter 23, positive-going voltages on the control electrode of discharge device 60 produce a corresponding voltage change across cathode resistor 62 and at the cathode of discharge device 61. Since the control electrode of device 61 is biased at a fixed potential, the device 61 is quickly driven beyond its current conduction cut-off characteristic and furnishes the clipping action for positive voltage swings. Negative-going voltages applied to the control electrode of device 60 are also clipped when they swing below the conduction cut-off potential of device 60, and the steady state condition of the negative clipped wave is transmitted through the common cathode coupling of resistor 62 to limit the maximum conduction condition of discharge device 61.

The purpose of reference level shifter 25 may best be understood by referring to the voltage wave shapes of Figs. 3, 3a, and 4. Figures 3 and 3a show the inaccuracies in pulse width measurement resulting from variations in amplitude or percentage pulse width as applied to conventional capacitively coupled amplitude limiters, while Fig. 4 illustrates the improvement produced by the reference level shifter 25. In Fig. 3 there are shown three voltage waves 50, 51, and 52 representing three series of amplified signal pulses of different amplitude or percentage pulse width, such as might be supplied to amplitude limiter 23 through capacitor 68 in the absence of median amplitude reference level shifter 25. More specifically, wave 50 represents a high amplitude wave having approximately a 20 percent pulse width of the entire cycle; wave 51 represents a lower amplitude wave of the same 20 percent pulse width, while wave 52 represents a wave having the same amplitude as wave 50 but a somewhat greater percentage pulse width.

For the purpose of better illustrating the inaccuracies involved, the pulses of wave 52 are shown as having the same absolute duration as those of wave 51 although as a practical matter with any given scanning system, it will be appreciated that there will be an increase in the absolute duration of each pulse before there is a change in percentage pulse width. The input voltage amplitude clipping levels of an amplitude limiter such as limiter 23 are represented by broken lines 53 and 54 and the three waves are plotted relative to these clipping levels in Fig. 3 to show the variation in the peak-to-peak amplitude levels of these waves normally resulting from the integrating action of a coupling capacitor such as capacitor 68. In Fig. 3a, individual pulses of each of the three waves 50, 51, and 52 are shown enlarged and superimposed upon each other in the same positions as in Fig. 3 relative to clipping levels 53 and 54. The times of rise and decay of the illustrated pulses are all shown as being equal since this will normally be the case due to the finite equal width of scanning slots 15. The portions of each pulse contained between the input clipping levels 53 and 54 of a limiter circuit determine, of course, the corresponding durations of the output pulses produced by the limiter.

As can be seen from Fig. 3a, different portions of waves 50 and 52 fall within these clipping levels as a result of the capacitor's action with different percentage pulse widths, and wave 50 will produce an output pulse from the limiter that is appreciably greater than that produced by wave 52.

Similarly, the higher rate of rise and decay of high amplitude wave 50 relative to that of lower amplitude wave 51 produces a slightly greater duration of effective pulse portion within clipping levels 53 and 54, and the output amplitude limited pulse due to wave 50 is of slightly greater duration than that produced by wave 51.

Referring now to Fig. 4, the function of the median amplitude reference level shifter 25 is demonstrated by a pair of different amplitude pulses 55 and 56 plotted with respect to clipping levels 53 and 54 of a limiter. As a result of the operation of reference level shifter, different amplitude pulses 55 and 56 are referred to the limiter from different voltage levels $L_1$ and $L_2$ so that their median amplitude portions M fall within clipping levels 53 and 54, with the result that the pulses have equal amplitude excursion above and below the clipping levels. The reference level shifter 25 serves to deliver the median amplitude portions M, of the signal pulses between predetermined clipping levels of the limiter regardless of differences in their amplitude or percentage pulse width with the result that the output pulses of the limiter vary solely in accordance with changes in absolute pulse width as determined by the width of the scanned edge portion of strip 1.

Referring now to the circuit diagram of reference level shifter 25 shown in Fig. 2, a general bias level for the entire reference level shifting network 25 is established at point C, the mid-connection of a pair of resistors 72 and 73 forming a voltage dividing network connected between the high voltage source and ground. Resistors 72 and 73 are so proportioned that the voltage at point C is equal to a voltage midway between the amplitude clipping levels of the input circuit of limiter 23. Presuming, for example, that the amplitude clipping levels of limiter 23 are 7 volts and 13 volts respectively, then the voltage at point C would be adjusted to be 10 volts. It will be appreciated that if the amplitude clipping levels are equidistant on both sides of a zero voltage, that no such general biasing voltage dividing network such as provided by resistors 72 and 73 is necessary, and the median amplitude reference level shifting network 25 may be referenced to zero or ground potential.

In the median amplitude reference level shifting network 25, means are provided for obtaining a uni-directional voltage representing one-half the instantaneous peak-to-peak amplitude of the incoming signal pulses. A diode 74 and a resistor 75 are connected in parallel from point C to coupling capacitor 70, while a pair of substantially identical resistors 76 and 77 are connected in series with another diode 78 also between point C and capacitor 70. Diodes 74 and 78, however, are reversely poled relative to the incoming signal. A pair of filter capacitors 79 and 80 are connected in series across resistors 76, 77 and 73 to provide the uni-directional component of the instantaneous voltages developed across these resistors. Resistor 75 and diode 74 function as a peak amplitude reference level shifting network, customarily called a "D.-C. restorer" or a "clamping network," to refer the positive peaks of the incoming pulses to an amplitude level determined by the voltage at point C. Similarly, diode 78 refers or "clamps" the voltage developed across resistors 76 and 77 to the negative peak amplitude level of the incoming signal as previously referenced to the general bias level voltage at point C by resistor 75 and diode 74. Consequently, due to the filtering action of capacitors 79 and 80, a uni-directional voltage is developed across resistors 76 and 77 which is equal to the peak-to-peak amplitude of the incoming signal, and a voltage equal to one-half this peak-to-peak amplitude is produced at point D, the mid-connection between resistors 76 and 77. The absolute value of this voltage at point D, however, is the sum of the general biasing voltage at point C and one-half this peak-to-peak amplitude voltage.

The negative peaks of the incoming signal supplied through capacitor 68 to limiter 23 are then referred or "clamped" to the level of the voltage at point D by yet another negative peak amplitude reference level shifting network comprising a resistor 81 and diode 82 connected in parallel between capacitor 68 and point D. The incoming voltage pulses appearing at point E and supplied to limiter 23 thereafter vary only in a positive-going direction from the voltage level of point D, with the result that the incoming signal is applied to limiter 23 with equal amplitude excursions on both sides of the general bias level voltage of point C, regardless of the amplitude or percentage pulse width of the input signal.

The operation of this median amplitude reference level shifter 25, may be better understood by referring to Fig. 5 which illustrates typical voltage wave shapes produced in shifter 25. In Fig. 5, waves 85 and 85a show different amplitude photoelectric element output voltages supplied from pre-amplifier 21 to the voltage amplification stage 21' associated with discharge device 66; waves 86 and 86a show corresponding amplified voltages produced at the anode of device 66; waves 87 and 87a show the voltages developed across resistors 73 and 75 and indicate the shift in reference level produced by the action of diode 74 so that the positive peaks of the waves are referred to the general bias level at point C; waves 88 and 88a show the voltage across resistors 73, 76 and 77; waves 89 and 89a show the voltages produced at point D; and waves 90 and 90a show the voltages at point E developed across resistor 81 relative to the presumed clipping levels of limiter 23. In each of the wave shapes of Fig. 5, the shaded area indicates the period of conduction of photoelectric element 6 and typical instantaneous voltages and uni-directional voltage reference levels are included. It is to be understood that the wave shapes of Fig. 5 are merely illustrative of the general typical operation of the circuit 25 and are not intended as exact reproductions and are not drawn to precise scale.

Referring to waves 86 and 87, it is seen that due to the action of diode 74, the anode voltage which varied, for example, between plus 30 and plus 150 volts is referred to a general 10 volt bias level voltage at point C to vary from plus 10 volts down to minus 110 volts. The substantially constant uni-directional voltage produced across resistors 76 and 77 by diode 78 and the filtering action of capacitors 79 and 80 is shown in curve 88 as a substantially constant uni-directional voltage of minus 110 volts, while one-half of this voltage relative to the bias level voltage and representing the voltage at point D is shown in wave 89 as minus 50 volts. As shown by wave 90, representing the voltage at point E, the input pulses coupled through capacitor 68 and applied to the control electrode of limiter 23 are referred to the voltage at point D by the action of diode 82. These input pulses thus vary between minus 50 and plus 70 volts, such that they have equal excursion above and below the presumed clipping levels of plus 7 and plus 13 volts of the limiter.

It will be appreciated that this same sequence of events occurs regardless of the amplitude or percentage pulse width of the incoming pulse, so that only the median amplitude portion of the signal will affect the limiter. If, as shown by waves 86a, 87a, 88a, 89a, and 90a, the incoming pulses have a peak-to-peak amplitude of 80 volts, the voltage at point D drops to minus 30 volts to produce an equal amplitude excursion of plus and minus 40 volts above and below the general bias level of plus 10 volts, as applied to limiter 23.

Referring again to Fig. 2, the amplitude limited pulses produced by both channels A and B are supplied to an adding network 27 comprising voltage dropping resistors 91 and 92 connected from the respective anodes of the output discharge devices of limiters 23 and 24 to a common terminal of a voltage adding resistor 93 whose other terminal is connected to ground. The pulses supplied to this voltage adder 27 have a duration depending upon the width of the object edge portions scanned by the photoelectric elements 6 and 7. The added voltage pulses appearing across resistor 93 are then supplied to the filter 28 shown as a narrow frequency band rejection filter 94, which preferably comprises a bridge-tee filter network, as shown, whose components are chosen to filter the frequencies in the neighborhood of the scanning repetition frequencies of the mechanical scanning systems employed. A capacitor 95 is also connected across resistor 93 to aid in filtering of any harmonics. Filter 28 functions to produce and supply an output uni-directional voltage to the deviation indicator 29, which voltage is the average uni-directional component of the added voltage pulses appearing across resistor 93. Due to the fact that filter 94 is designed to reject only the alternating components of the scanning repetition frequency, this filter has very fast response, and changes in the duration or amplitude of the added voltage pulses across resistor 93 immediately appear as changes in the uni-directional voltage supplied to deviation indicator 29.

The deviation indicator 29 may simply comprise a D. C. meter but preferably comprises a bridge network 95 including an electron discharge device 96 as one of the balancing arms of bridge 95 and a meter 97 as the diagonal thereof. Resistors 98, 99 and rheostat 100 constitute the remaining arms of bridge 95 and a rheostat 101 is preferably connected in series with meter 97 to enable control of the range of deviation thereof. The bridge can be balanced for different currents through discharge device 96 by variation of the magnitude of resistance 100. The control electrode of discharge device 96 is connected to receive the averaged uni-directional voltage component of the added pulses produced by filter 28. If the bridge 95 is balanced to the filtered voltage occurring when strip 1 under the gage is a normal or desired width, then any change thereafter in the filtered voltage supplied to the control electrode of discharge device 96 will vary the conduction in device 96, upset the bridge balance, and produce a corresponding deviation in the current flow through, and resulting indication of, meter 97.

Referring now to Fig. 6, there is shown a pair of voltage waves 102 and 103 representing typical amplitude limited pulses supplied to the adding network 27 when the scanning of the opposite edges of the strip 1 by the two scanning systems is neither synchronous nor simultaneous. Voltage wave 102 shows a constant pulse duration output wave of channel A while voltage wave 103 shows a different constant pulse duration output wave of channel B. A third voltage wave 104 shows the resulting voltage produced across resistor 93 before filtering, while a fourth voltage wave 105 represents the resulting average voltage component produced by the filtering action of filter 28. As can be seen from an inspection of these voltage waves, the filtered voltage remains substantially constant for input amplitude limited pulses from both channels of respective constant duration, regardless of their time of combination across resistor 93. This is due to the fact, illustrated by voltage waves 104 and 105, that the increased amplitude of the voltage pulses produced across resistor 93 when the incoming pulses from both channels A and B coincide has substantially the same effect upon filter 28 as the increased pulse duration when the pulses do not coincide.

In the operation of the above described gage, an increase in the width of strip 1 increases the duration of the heavy conduction pulses in at least one of the phototubes 6 and 7. As a consequence, the average voltage component of all the added constant amplitude photoelectric cell pulses provided by the above-described circuit also increases, and this average voltage component constitutes a measurement of the change in width of strip 1. Deviation indicator 29 which is connected to be energized by this average voltage component gives a visual indication of this change in width by a corresponding movement in the indicating needle of meter 97 away from a normal or zero setting achieved by a previous adjustment or balancing of bridge network 95 of indicator 29 with a normal or desired width of strip 1 under the gage. A decrease in the width of strip 1 from this normal or desired width produces a corresponding decrease in the uni-directional averaged voltage output of filter 28 to produce a corresponding movement of meter 97 in an opposite direction to that occurring with an increase in the width of strip 1.

It will thus be seen that I have provided a simplified width gage of the dual edge-sighting type which employs a simple optical sighting system and easily constructed scanning components. By utilizing a circuit which electrically adds and then filters all the constant amplitude pulses produced by both channels A and B, associated with the two photoelectric elements 6 and 7, the necessity for synchronization or simultaneity of scanning is eliminated. Moreover, the median amplitude reference level shifter 25 included in the pulse amplitude limiting means of my above-described gage insures that the averaged voltage output of filter 28 depends only upon the duration of the photoelectric element output pulses and thus upon the width of strip 1, and not upon changes in percentage pulse width nor upon changes in rate of rise or decay of the pulses, such as may be produced by changes in the luminosity of the hot steel strip 1.

Although I have disclosed above a particular embodiment of my invention, many modifications can of course be made. I intend, therefore, by the appended claims to cover all such modifications as fall within the true spirit and scope of my invention.

What I claim as new and desire to secure by Letters Patent of the United States is:

1. A non-contacting gage for measuring the width of a luminous or illuminated object comprising a pair of photoelectric elements, optical means positioned to project upon said photoelectric elements respective images of two laterally spaced fields of view, mechanical means for scanning periodically said projected images along a dimension in the same direction as the lateral spacing of said fields of view, a respective amplifier connected to each photoelectric element for producing amplified voltage pulses responsive to any conduction pulses produced in said photoelectric element by the scanning of said projected images, a respective pulse amplitude limiter connected to each amplifier for limiting said voltage pulses to a constant amplitude, a voltage adder connected to receive the constant amplitude pulses produced by the two amplitude limiters, and a filter connected to receive the added voltage output of said adder for providing the average uni-directional component thereof.

2. A non-contacting gage for measuring the width of a luminous or illuminated object comprising a pair of photoelectric elements, optical means for projecting upon said photoelectric elements the respective images of two fields of view, each field including an opposite edge portion of such object, mechanical scanning means for scanning periodically the width of said projected images to produce a series of conduction pulses in each said photoelectric element, each series having pulse durations depending upon the width of the object edge portion within a respective one of said fields of view, amplifying means responsive to the conduction of said photoelectric elements for producing two series of amplified voltage pulses corresponding to the two series of conduction pulses, means for limiting the amplitude of each said series of voltage pulses to a constant value, means for electrically adding algebraically the amplitude limited pulses of both series, and means for averaging said added pulses electrically to obtain the average uni-directional component thereof constituting a measurement of the width of said object.

3. A non-contacting gage for measuring the width of a luminous or illuminated object comprising a pair of phototubes, a pair of optical systems positioned to project upon said phototubes respective images of two laterally spaced fields of view, mechanical means for scanning periodically said projected images along a dimension in the same direction as the lateral spacing of said fields of view, voltage amplifying means responsive to conduction of said photocells for producing amplified voltage pulses corresponding to phototube conduction pulses provided by the scanning of said projected images, means for limiting the amplitude of the amplified voltage pulses of each photocell to a constant value, adding means for obtaining the algebraic sum of all said amplitude limited pulses, filtering means for providing the average uni-directional voltage component of said added pulses, and means responsive to said average uni-directional voltage component for indicating deviations thereof from a predetermined normal value.

4. A non-contacting gage for measuring the width of a luminous or illuminated object comprising a pair of photoelectric elements, a pair of optical systems positioned to project uopn said photoelectric elements respective images of two laterally spaced fields of view, a rotating scanning member located to scan periodically said projected images along a dimension in the same direction as the lateral spacing of said fields, a different amplifier connected to each photoelectric element for producing amplified voltage pulses responsive to any conduction pulses occurring in said photocell by the scanning of said projected images, a pair of voltage amplitude limiters having input voltage clipping levels for producing constant amplitude pulses in response to input voltage pulses ranging beyond said clipping levels, means for delivering to a different limiter the amplified voltage output of each amplifier with substantially equal amplitude excursion above and below the clipping levels of said limiters, a voltage adder connected to receive the constant amplitude pulses produced by the two amplitude limiters, and filtering means connected to receive the added voltage output of said adder for providing the average uni-directional voltage component thereof.

5. A non-contacting gage for measuring the width of a luminous or illuminated object comprising a pair of photoelectric elements, a pair of optical systems for projecting upon said photoelectric elements respective images of two fields of view, each field including an opposite edge portion of such object, mechanical scanning means for scanning periodically the width of said projected images to produce a series of conduction pulses in each said photoelectric element, each series having pulse durations depending upon the width of the object edge portion within a respective one of said fields of view, a different amplifier connected to each photoelectric element for providing amplified voltage pulses responsive to the conduction pulses of said photoelectric elements, a pair of voltage amplitude limiters having input voltage clipping levels for providing constant amplitude pulses in response to input voltage pulses ranging beyond said clipping levels, a pair of median amplitude reference level shifters each connected between a respective one of said amplifiers and a respective one of said limiters for delivering the amplified voltage pulses to the limiter with the median amplitude portion of said amplified voltage pulses within said clipping levels, voltage adding means connected to receive and provide the algebraic sum of the constant amplitude pulses produced by the two amplitude limiters, and filtering means connected to receive and average the added voltage pulses.

6. In pulse producing apparatus of the type employing a photoelectric element and scanning means for periodically exposing the photoelectric element to illumination, a circuit responsive to the duration of resulting photoelectric element conduction pulses substantially independent of the percentage pulse width or rate of rise or decay thereof, comprising an amplifier connected to said photoelectric element for providing amplified voltage pulses responsive to the conduction pulses of said element, an amplitude limiter, and a median amplitude reference level shifter connected between said amplifier and said limiter for delivering said amplified voltage pulses to said limiter, said median amplitude reference level shifter including means providing a uni-directional voltage equal to one-half the peak-to-peak amplitude of said amplified voltage pulses and reference level shifting means for shifting the peak amplitude of the pulses delivered to said limiter to the level of said uni-directional voltage.

7. A pulse duration responsive circuit comprising an amplitude limiter having a limiting action to input voltage pulses ranging in amplitude beyond upper and lower input clipping levels, means for supplying input pulses to said limiter, means providing a uni-directional voltage equal to one-half the instantaneous peak-to-peak amplitude of the input pulses, and reference level shifting means responsive to said uni-directional voltage for referring the supplied input pulses to said limiter with substantially equal amplitude excursion above and below said respective upper and lower clipping levels.

8. A pulse duration responsive circuit comprising an amplitude limiter having an amplitude limiting action to input voltage pulses ranging in amplitude beyond a pair of upper and lower input clipping levels, a first peak amplitude reference level shifting network operative in response to input pulses to refer the positive peak amplitude of said pulses to an amplitude level midway between said clipping levels, means providing a uni-directional voltage substantially equal to one-half the peak-to-peak amplitude of said first reference level-shifted pulses, means for coupling input pulses to said limiter and to said first peak amplitude reference level shifting network, and a second peak amplitude reference level shifting network connected to receive said uni-directional voltage and operative in response to the input pulses coupled to said limiter for referring the negative peak amplitude of said limiter coupled input pulses to the level of said uni-directional voltage.

9. A circuit for comparing width of electric pulses substantially independent of rate of rise or decay thereof comprising an amplitude limiter operative between input amplitude clipping levels, first reference level shifting means operative in response to input pulses to be compared for referring negative-going amplitude variations of the input pulses to an amplitude level midway between said clipping levels, voltage dividing and filtering means providing a uni-directional voltage substantially equal to one-half the peak-to-peak amplitude of said negative-going variations, means for coupling said input pulses to be compared to said limiter, and second reference level shifting means operative in response to said coupled pulses for referring positive-going amplitude variations of said coupled pulses to the level of said uni-directional voltage.

10. A median amplitude reference level shifter for delivering voltage pulses to an amplitude limiter with equal amplitude excursion above and below input clipping levels of the limiter comprising a source of constant potential having an amplitude midway between said clipping levels, a positive peak amplitude reference level shifting network for referring the positive peak amplitude of input voltage pulses to said constant potential, means for clamping the negative peak amplitude of the input voltage pulses relative to said constant potential, voltage dividing and filtering means providing a uni-directional voltage equal to one-half the peak-to-peak amplitude of said positive peak amplitude reference level shifted pulses, and a negative peak amplitude reference level shifting network for referring the negative peak amplitude of said input voltage pulses to said uni-directional voltage.

11. A median amplitude reference level shifter for delivering voltage pulses to an amplitude limiter with equal amplitude excursion above and below input clipping levels of the limiter comprising a first resistor and a first diode connected in parallel with said first resistor, a first capacitor connected to couple input voltage pulses across said first resistor and first diode, a second diode and a voltage divider connected in series across said first resistor, filtering means connected to said voltage divider for providing a unidirectional component of the voltage produced in said divider, a second capacitor for coupling input voltage pulses to an amplitude limiter, and a third resistor and a third diode connected in parallel between said second capacitor and the mid-voltage point of said voltage divider, said second and third diodes having a polarity opposite to that of said first diode relative to the input voltage pulses.

12. A non-contacting gage for measuring the width of a moving strip of opaque material comprising a pair of optical systems which provide viewing and scanning of fixed fields of view including opposite edges of the moving strip of material and produce voltage pulses in accordance with the position of the edge of the moving strip of material in the field of view, a pair of amplitude reference level shifters for shifting the reference level of an input wave in such a manner that it has substantially equal amplitude excursions above and below a predetermined reference level, each of said amplitude reference level shifters being connected to receive the output pulses of an opposite optical system, a pair of voltage amplitude limiters having input voltage clipping levels for producing constant amplitude pulses in response to input voltage pulses having magnitudes which exceed said clipping levels, each of said amplitude limiters being operatively connected to receive the output of one of said amplitude reference level shifters, a voltage adder connected to receive the constant amplitude pulses produced by the two amplitude limiters for producing an output voltage wave which represents the algebraic sum of said constant amplitude pulses, and means for averaging said added pulses electrically to obtain the average unidirectional component thereof constituting a measurement of the width of said object.

References Cited in the file of this patent

UNITED STATES PATENTS

| | | |
|---|---|---|
| 2,208,447 | Berry | July 16, 1940 |
| 2,408,078 | Labin et al. | Sept. 24, 1946 |
| 2,411,695 | Rado | Nov. 26, 1946 |
| 2,474,906 | Meloon | July 5, 1949 |
| 2,514,985 | Banner | July 11, 1950 |
| 2,548,590 | Cook | Apr. 10, 1951 |